United States Patent
Nakai

(10) Patent No.: US 9,967,540 B2
(45) Date of Patent: May 8, 2018

(54) ULTRA HIGH DEFINITION 3D CONVERSION DEVICE AND AN ULTRA HIGH DEFINITION 3D DISPLAY SYSTEM

(71) Applicant: BOE Technology Group Co., Ltd., Beijing (CN)

(72) Inventor: Tadashi Nakai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 301 days.

(21) Appl. No.: 14/771,702

(22) PCT Filed: Sep. 29, 2014

(86) PCT No.: PCT/CN2014/087799
§ 371 (c)(1),
(2) Date: Aug. 31, 2015

(87) PCT Pub. No.: WO2015/188525
PCT Pub. Date: Dec. 17, 2015

(65) Prior Publication Data
US 2016/0366390 A1    Dec. 15, 2016

(30) Foreign Application Priority Data

Jun. 12, 2014 (CN) .......................... 2014 1 0262053

(51) Int. Cl.
*H04N 7/015*    (2006.01)
*H04N 13/04*    (2006.01)
*H04N 13/00*    (2018.01)

(52) U.S. Cl.
CPC ......... *H04N 13/0029* (2013.01); *H04N 7/015* (2013.01); *H04N 13/0018* (2013.01);
(Continued)

(58) Field of Classification Search
CPC .............. H04N 7/015; H04N 13/0029; H04N 13/0018; H04N 13/0037
See application file for complete search history.

(56) References Cited

U.S. PATENT DOCUMENTS

| | | | |
|---|---|---|---|
| 2011/0254929 A1 | 10/2011 | Yang et al. | |
| 2014/0285483 A1* | 9/2014 | Yamanaka | G06T 1/60 345/419 |
| 2015/0381959 A1* | 12/2015 | Lee | H04N 13/0022 382/154 |

FOREIGN PATENT DOCUMENTS

| | | |
|---|---|---|
| CN | 102075773 A | 5/2011 |
| CN | 102291587 A | 12/2011 |

(Continued)

OTHER PUBLICATIONS

Third Office Action for Chinese Patent Application No. 201410262053.0, dated Feb. 22, 2016, 15 pages.

(Continued)

*Primary Examiner* — Obafemi Sosanya
(74) *Attorney, Agent, or Firm* — Westman, Champlin & Koehler, P.A.

(57) ABSTRACT

The invention discloses an ultra high definition 3D conversion device and an ultra high definition 3D display system, which may convert the received full high definition video signal or ultra high definition video signal into a 3D signal corresponding to the type of 3D display after performing an image quality process, according to the type of 3D display chosen by a user. This may achieve the Active Shutter type, Film-type Patterned Retarder (FPR) type and naked-eye type of 3D display for the ultra high definition video signal.

16 Claims, 4 Drawing Sheets

(52) U.S. Cl.
CPC ......... *H04N 13/0037* (2013.01); *H04N 13/04* (2013.01); *H04N 13/0409* (2013.01); *H04N 13/0436* (2013.01); *H04N 13/0454* (2013.01); *H04N 13/0497* (2013.01); *H04N 2213/007* (2013.01)

(56) References Cited

FOREIGN PATENT DOCUMENTS

| CN | 102457739 A | 5/2012 |
|---|---|---|
| CN | 102474642 A | 5/2012 |
| CN | 102595154 A | 7/2012 |
| CN | 102857770 A | 1/2013 |
| CN | 103033996 A | 4/2013 |
| CN | 103260044 A | 8/2013 |
| CN | 103607553 A | 2/2014 |
| CN | 103686123 A | 3/2014 |
| CN | 103702060 A | 4/2014 |
| CN | 104065944 A | 9/2014 |
| JP | 2010-124352 A | 6/2010 |
| WO | 2011/080911 A1 | 7/2011 |

OTHER PUBLICATIONS

International Search Report and Written Opinion for PCT Application No. PCT/CN2014/087799, dated Mar. 17, 2015, 9 pages.

English translation of Box No. V from the Written Opinion for the International Searching Authority for PCT Application No. PCT/CN2014/087799, 2 pages.

First Chinese Office Action for Chinese Patent Application No. 201410267053.0, dated Jul. 31, 2015, 20 pages.

Second Chinese Office Action for Chinese Patent Application No. 201410262053.0, dated Oct. 23, 2015, 18 pages.

\* cited by examiner

ULTRA HIGH DEFINITION 3D CONVERSION DEVICE AND AN ULTRA HIGH DEFINITION 3D DISPLAY SYSTEM

CROSS-REFERENCE TO RELATED APPLICATIONS

This application is a Section 371 National Stage Application of International Application No. PCT/CN2014/087799, filed 29 Sep. 2014, which claims priority from Chinese Patent Application No. 201410262053.0, filed on Jun. 12, 2014, the disclosure of which is incorporated herein by reference in its entirety.

TECHNICAL FIELD

The application relates to the field of 3D display, particularly, to an ultra high definition 3D conversion device and an ultra high definition 3D display system.

BACKGROUND

Recently, the commonly used display screens adopt 2D display technologies for displaying. 2D display technologies cannot intuitively represent the information on the depths of scenes. With the development of computer information technology and display technology, 3D stereoscopic display technology becomes a focus in the display field. Since 3D stereoscopic display technology can entirely reproduce the 3D spatial information of a scene, users can observe a 3D stereoscopic image which is coming out from the screen and suspending in the air.

Recently, 3D display technologies are classified into two types, one is for the naked-eye type, and the other is for the glasses type. The 3D display technologies with glasses can be further divided into Film-type Patterned Retarder (FPR) and Active Shutter. The naked-eye 3D display technologies typically set a barrier such as grating barrier before the display panel, and form several fields of view before the display panel by using the grating barrier, such that the light emitted by the different sub-pixel units on the display panel may fall into different fields of view. The observer may experience a 3D perception due to his/her eyes falling into different fields of view.

With the development of the display technology, the requirements for video quality become higher. More recently, videos with an ultra high definition (4K×2K) have been developed. Usually 720P is defined as high definition standard, and the high definition television in related art has a resolution of 1280×720. A resolution of 4K×2K may require a physical resolution of 3840×2160, which is twice as the full high definition (FHD, 1920×1080) in height and width, and four times in area. The total number of the pixels of a display with a resolution of 3840×2160 may be above 8 million.

Ultra high definition display has already become the trend for video display, but there is no such device for performing 3D display for the ultra high definition videos right now.

SUMMARY OF THE INVENTION

Accordingly, the embodiment of the invention provides an ultra high definition 3D conversion device and an ultra high definition 3D display system, for 3D displaying high definition videos in different 3D display modes.

Therefore, the embodiment of the invention provides an ultra high definition 3D conversion device, including:

a receiving module, for receiving an ultra high definition video signal, or receiving a full high definition video signal and converting the received full high definition video signal into an ultra high definition video signal;

an image quality processing module, for processing the image quality of the ultra high definition video signal received or converted by the receiving module;

a 3D signal processing module, for converting the ultra high definition video signal processed by the image quality processing module into a 3D signal corresponding to the type of 3D display, wherein the type of 3D display may include an Active Shutter type, a Film-type Patterned Retarder (FPR) type and a naked-eye type; and an output module, for sending the 3D signal to a control chip corresponding to the type of 3D display in the display screen.

The ultra high definition 3D conversion device according to the embodiment of the invention may convert the received full high definition video signal or the ultra high definition video signal into a 3D signal corresponding to the type of the 3D display after processing the image quality of the 3D signal, according to the selected type of the 3D display. This may achieve an Active Shutter type, FPR type or naked-eye type 3D display for the ultra high definition video signal in a system.

In another implementation, the 3D signal processing module of the above ultra high definition 3D conversion device according to the embodiment of the invention may include:

a 3D signal conversion circuit, for converting a 2D signal into a 3D signal and outputting the converted 3D signal when the ultra high definition video signal processed by the image quality processing module is the 2D signal; or outputting a 3D signal directly when the ultra high definition video signal processed by the image quality processing module is the 3D signal, The 3D signal processing module may further include at least one of:

a generation circuit for FPR 3D signals, for generating a FPR 3D signal according to the 3D signal output by the 3D signal conversion circuit to be viewed through a FPR glasses;

a generation circuit for active shutter 3D signals, for generating an active shutter 3D signal according to the 3D signal output by the 3D signal conversion circuit to be viewed through an active shutter glasses; and a generation circuit for naked-eye 3D signals, for generating a naked-eye 3D signal according to the 3D signal output by the 3D signal conversion circuit to be viewed after the modulation by a grating barrier before the display screen.

In another implementation, the output module of the above ultra high definition 3D conversion device according to the embodiment of the invention may include:

a 3D signal output circuit, for sending at least one of the FPR 3D signal, the active shutter 3D signal and the naked-eye 3D signal to the respective clock controllers in the display screen after dividing at least one of the FPR 3D signal, the active shutter 3D signal and the naked-eye 3D signal into multipath;

an adjustment circuit for an active shutter glasses, for generating a control signal for controlling the switching of the left and right lens of the active shutter glasses according to the active shutter 3D signal, and then sending the control signal to the active shutter glasses; and an adjustment circuit for an grating barrier, for generating a control signal for adjusting the grating barrier to achieve 3D display according to the naked-eye 3D signal, and then sending the control signal to the grating barrier.

In another implementation, the receiving module of the above ultra high definition 3D conversion device according to the embodiment of the invention may include:
- a receiving circuit for a full high definition video signal, for receiving the full high definition video signal transmitted from a digital television system on chip;
- a frequency conversion circuit, for converting the full high definition video signal received by the receiving circuit for a full high definition video signal, into an ultra high definition video signal; and
- a receiving circuit for an ultra high definition video signal, for receiving the ultra high definition video signal transmitted from an external input source.

In another implementation, the receiving module of the above ultra high definition 3D conversion device according to the embodiment of the invention may further include:
- a data register circuit, for receiving a full high definition video signal transmitted from an external Flash circuit; and
- wherein the receiving circuit for a full high definition video signal is further used for receiving the full high definition video signal forwarded by the data register circuit.

In another implementation, the image quality processing module of the above ultra high definition 3D conversion device according to the embodiment of the invention may particularly include:
- a format conversion circuit, for converting the ultra high definition video signal received or converted by the receiving module from a RGB signal into a YUV signal; and
- a signal optimization circuit, for performing a edge enhancement and an image quality adjustment process on the YUV signal converted by the format conversion circuit, and then converting into a RGB signal.

In another implementation, the image quality processing module of the above ultra high definition 3D conversion device according to the embodiment of the invention may further include:
- an aspect ratio adjustment circuit, for adjust the aspect ratio of the ultra high definition video signal received or converted by the receiving module according to the aspect ratio chosen by a user.

In another implementation, the image quality processing module of the above ultra high definition 3D conversion device according to the embodiment of the invention may further include:
- a frequency doubling circuit, for doubling the frequency of the ultra high definition video signal received or converted by the receiving module from 60 Hz to 120 Hz.

In another implementation, the above ultra high definition 3D conversion device according to the embodiment of the invention may further include: a backlight adjustment circuit, for generating a control signal for controlling the backlight module in the display screen, according to the ultra high definition video signal processed by the image quality processing module, and then sending the control signal to the backlight module.

The embodiment of the invention provides an ultra high definition 3D display system, including: a video processing device and a display device.

The display device has a display screen, an ultra high definition 3D conversion device, and a control chip, configured to control the display screen to perform the 3D display according to the 3D signal transmitted from the ultra high definition 3D conversion device.

The video processing device may have a digital television system on chip which can send a full high definition video signal to the ultra high definition 3D conversion device.

BRIEF DESCRIPTION OF THE DRAWING FIGURES

DETAILED DESCRIPTION OF THE EXEMPLARY EMBODIMENTS

Figure 1:
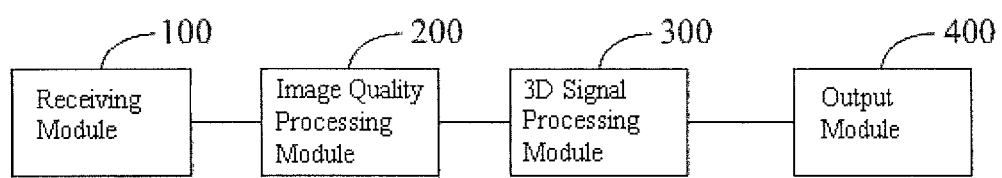
FIG. 1 is a schematic diagram illustrating the structure of the ultra high definition 3D conversion device according to the embodiment of the invention.

The implementations of the ultra high definition 3D conversion device and the ultra high definition 3D display system according to the embodiment of the invention are discussed in detail with reference to the drawing figures.

The embodiment of the invention provides an ultra high definition 3D conversion device as shown in FIG. 1, particularly including: a receiving module 100, an image quality processing module 200, a 3D signal processing module 300 and an output module 400.

The receiving module 100 may receive an ultra high definition video signal, or receive a full high definition video signal and convert the received full high definition video signal to an ultra high definition video signal. The image quality processing module 200 may process the image quality of the ultra high definition video signal received or converted by the receiving module 100. The 3D signal processing module 300 may convert the ultra high definition video signal processed by the image quality processing module 200 into a 3D signal corresponding to the type of 3D display. The type of 3D display may include an Active Shutter type, a Film-type Patterned Retarder (FPR) type and a naked-eye type, wherein the Active Shutter type and the Film-type Patterned Retarder (FPR) type belong to the type of the 3D display with a glasses. The output module 400 may send the 3D signal to a control chip corresponding to the type of 3D display in the display screen.

The above ultra high definition 3D conversion device according to the embodiment of the invention may perform the image quality process on the received full high definition video signal or the ultra high definition video signal, and then convert the signal into a 3D signal corresponding to the type of the 3D display, achieving an Active Shutter type, FPR type or naked-eye type 3D display for the ultra high definition video signal.

Hereinafter, the respective modules in the above ultra high definition 3D conversion device may be discussed in detail.

Figure 2:
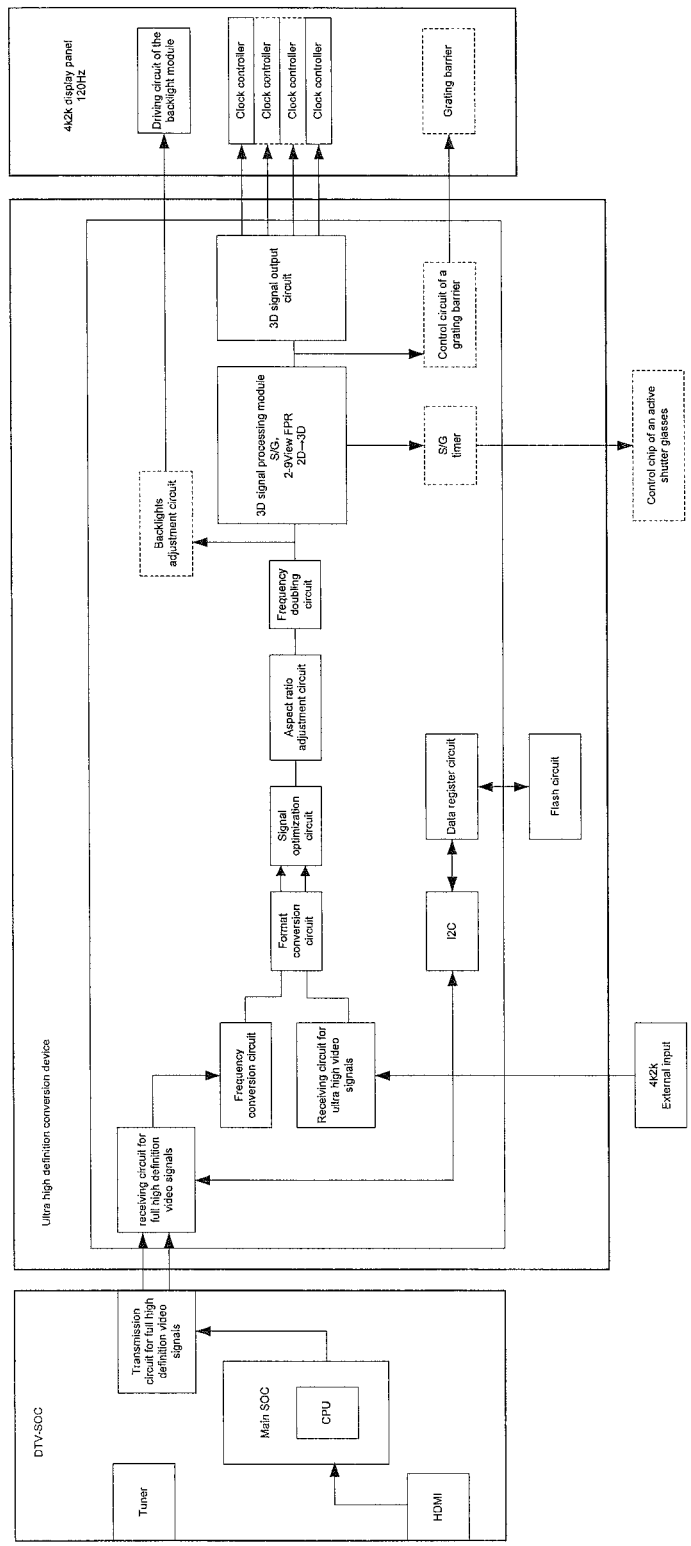
FIG. 2 is a schematic diagram illustrating the structure of the ultra high definition 3D display system according to the embodiment of the invention.

In implementing, the receiving module 100 in the above device according to the embodiment of the invention particularly may receive a full high definition (2k×1k) video signal from the digital television system on chip (DTV-SOC), may also receive an ultra high definition (4k×2k) video signal transmitted from an external input source. In particular, as shown in FIG. 2, the receiving module 100 may include:

a receiving circuit, for a full high definition video signal (LVDS Rx), for receiving the full high definition video signal transmitted from a digital television system on chip (DTV-SOC). In implementing, the transmission circuit for a full high definition video signal (LVDS Tx) and the receiving circuit for a full high definition video signal (LVDS Rx) in the DTV-SOC can communicate with each other via a I2C bus;

a frequency conversion circuit (4k×2k Up Scaler), for converting the full high definition (2k×1k) video signal received by the receiving circuit for a full high definition video signal (LVDS Rx), into an ultra high definition (4k×2k) video signal; and a receiving circuit for an ultra high definition video signal (TMDS Rx), for receiving the ultra high definition (4k×2k) video signal transmitted from the external input source. Further, TMDS Rx normally may perform a pixel conversion after receiving the ultra high definition video signal.

Further, in addition to an ultra high definition (4k×2k) video signal transmitted from the external input source and the full high definition (2k×1k) video signal from the DTV-SOC, the receiving module 100 of the above ultra high definition 3D conversion device according to the embodiment of the invention may further receive a full high definition (2k×1k) video signal transmitted from an external Flash circuit. Accordingly, as shown in FIG. 2, the receiving module 100 may further include:

a data register circuit, for receiving a full high definition (2k×1k) video signal transmitted from an external Flash circuit, subsequently sending the full high definition video signal to the full high definition video signal (LVDS Rx) via the I2C bus. Accordingly, the full high definition video signal (LVDS Rx) may be further used for receiving the full high definition (2k×1k) video signal forwarded by the data register circuit.

In implementing, as shown in FIG. 2, the image quality processor 200 of the above device according to the embodiment of the invention may particularly include:

a format conversion circuit (RGB→YUV), for converting the ultra high definition video signal transmitted by the receiving module 100 from a RGB signal into a YUV signal to facilitate the image quality process performed by other circuit modules; and a signal optimization circuit (Enhancer/RGB Processor), for performing a edge enhancement and an image quality adjustment process on the YUV signal converted by the format conversion circuit (RGB→YUV), and then converting the YUV signal into a RGB signal. Particularly, the image quality adjustment may include a brightness level adjustment, a color level adjustment, a white and black contrast adjustment, a hue adjustment, a gamma adjustment and the like.

Further, as shown in FIG. 2, the image quality processing module 200 of the above device according to the embodiment of the invention may include:

an aspect ratio modulation circuit (OSD Gen), for adjusting the aspect ratio of the ultra high definition video signal transmitted by the receiving module 100 according to the aspect ratio chosen by a user.

Further, as shown in FIG. 2, the image quality processing module 200 of the above device according to the embodiment of the invention may also include:

a frequency doubling circuit (4k×2k FRC), for doubling the frequency of the ultra high definition transmitted by the receiving module 100 from 60 Hz to 120 Hz.

It is noted that there is no requirement on the connection order between the respective circuit modules contained in the image quality processing module 200 in implementing. This means that the ultra high definition video signal transmitted by the receiving module 100 may be first converted into a YUV signal and then experience an image quality adjustment, which is followed by an aspect ratio adjustment and a frequency doubling adjustment; or may experience an aspect ratio adjustment and a frequency doubling adjustment, and then may be converted into a YUV signal, which is followed by an image quality adjustment, which is not specifically defined.

In implementing, the 3D signal processing module 300 of the above device according to the embodiment of the invention may particularly include: a 3D signal conversion circuit (2D→3D), a generation circuit for FPR 3D signals (3D FPR), a generation circuit for active shutter 3D signals (S/G) and a generation circuit for naked-eye 3D signals (2-9View).

The 3D signal conversion circuit (2D→3D) may convert the ultra high definition video signal processed by the image quality processing module 200 from a 2D signal into a 3D signal, i.e. when requiring a 3D display, convert the 2D video signal into the 3D video signal and output the converted 3D video signal. If the video signal inputted by the external source is a 3D video signal, then the 3D signal conversion circuit would output the 3D video signal directly, rather than perform the conversion operation.

The generation circuit for FPR 3D signals (3D FPR) may generate a FPR 3D signal (a Line By Line signal) according to the 3D signal output by the 3D signal conversion circuit (2D→3D), to be viewed through a FPR glasses. The Line by Line display technology is also referred as an interlacing operation, in which the images of the right and left eye may be arranged from top to bottom to in an interlaced manner of the scan lines. The user can distinguish the left eye image and the right eye image on the screen by a FPR glasses, therefore achieving a 3D display effect. In the embodiment, a Line By Line 3D video signal with a resolution of 4k×2k and a frequency of 120 Hz is generated and outputted on the display panel. The user can view the 3D image by wearing a FPR glasses.

The generation circuit for active shutter signals (S/G) may generate an active shutter signal (a FSQ signal) according to the 3D signal output by the 3D signal conversion circuit (2D→3D), to be viewed through an active shutter glasses. In particular, the generation circuit for active shutter signals (S/G) may convert the 3D signal output by the 3D signal conversion circuit (2D→3D) into a FSQ (frame consecutive) signal. The FSQ signal is ultra high definition pictures transmitted at a certain rate, wherein the respective frames alternate sequentially, and the display screen first receive a left eye frame and then receive a right eye frame. Since there is no timing for the LR (the right and left frames) in the FSQ signal, by inserting a LR-Flag in the FSQ signal, the timing may obtained in the 3D signal processing module. In the embodiment, a FSQ 3D video signal with a resolution of 4k×2k and a frequency of 120 Hz is generated and outputted on the display panel. Thus the user can view the 3D image by wearing an active shutter glasses.

The generation circuit for naked-eye 3D signals (2-9View) may generate a naked-eye 3D signal (2-9View) according to the 3D signal output by the 3D signal conversion circuit (2D→3D), to be viewed after the modulation by a grating barrier before the display screen. In particular, the generation circuit for naked-eye 3D signals (2-9View) may convert the 3D signal output by the 3D signal conversion circuit (2D→3D) into a Line by Line signal, convert the Line by Line signal into two-view (2 View) signal (i.e. LR (the left eye and the right eye) signal), perform the multi-parallax conversion (2-9View) on the LR signal, and finally composite a multi-parallax image. In the embodiment, a 9 View 3D video signal with a resolution of 4k×2k and a frequency of 120 Hz is generated and outputted on the display panel. Thus the user can view the 3D image by naked-eye.

Therefore, the 3D signal processing module 300 may provide three different types of 3D video signals for the ultra high definition video signal, thereby achieving a common system for the display panel with a resolution of 4k×2k and a frequency of 120 Hz.

In implementing, as shown in FIG. 2, the output module 400 of the above device according to the embodiment of the invention may include:
- a 3D signal output circuit (V by One Tx), for dividing the FPR 3D signal, the active shutter 3D signal or the naked-eye 3D signal into multipath, and then sending the signals to the respective clock controllers (TCON) in the display screen, normally the signal is divided into 16 path (16 Lane) outputs;
- an adjustment circuit for an active shutter glasses (S/G Timing), for generating a control signal for controlling the switching of the left and right lens of the active shutter glasses according to the active shutter 3D signal, and then sending the control signal to the control chip (S/G Wireless Unit) of the active shutter glasses; and
- an adjustment circuit for an grating barrier (Active Barrier), for generating a control signal for adjusting the grating barrier to achieve 3D display according to the naked-eye 3D signal, and then sending the control signal to the control chip (Barrier) of the grating barrier.

Further, the above ultra high definition 3D conversion device according to the embodiment of the invention is normally used to provide a 3D signal to the liquid crystal display screen (LCD). Normally, there is a control chip for controlling the illumination of a backlight module in the LCD, since the LCD lightens passively. Therefore, as shown in FIG. 2, the above ultra high definition 3D conversion device according to the embodiment of the invention may further include:
- a backlight adjustment circuit (Local Dimming), for generating a control signal for controlling the backlight module in the display screen, according to the ultra high definition video signal processed by the image quality processing module 200, and then sending the control signal to the control chip (LED Driver) of the backlight module.

Figure 3:
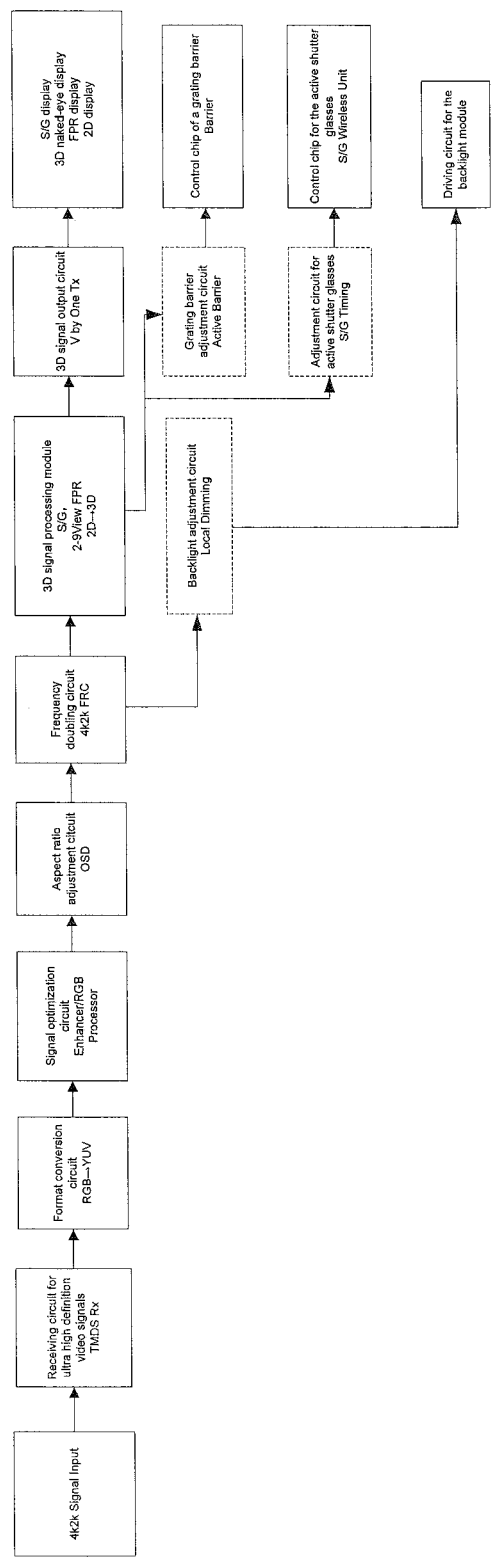
FIG. 3 is a schematic diagram illustrating a signal flow of the signal with a resolution of 4k×2k in the ultra high definition 3D conversion device according to the embodiment of the invention.
Figure 4:
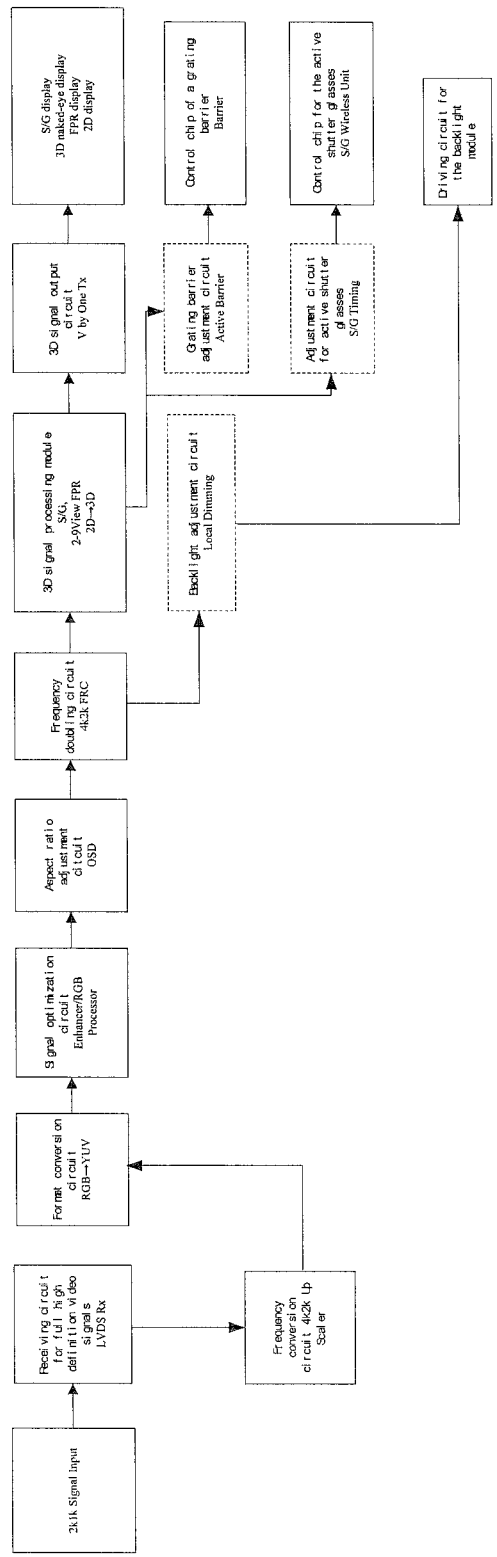
FIG. 4 is a schematic diagram illustrating a signal flow of the signal with a resolution of 2k×1k in the ultra high definition 3D conversion device according to the embodiment of the invention.

In implementing, the operation states of the respective circuits in the above ultra high definition 3D conversion device according to the embodiment of the invention may be different depending on the different input modes. FIGS. 3 and 4 illustrate signal flow of the signal in the above device according to the embodiment of the invention when the signal is a signal with a resolution of 2k×1k and a resolution of 4k×2k inputted by an external input source, respectively. In particular, as shown in FIG. 3, a video signal with a resolution of 4k×2k is received at the receiving circuit for the ultra high definition video signal. The video signal is processed by the image quality processing module, and converted into a 3D signal by the 3D signal processing module, for three different modes (i.e. Active Shutter type, Film-type Patterned Retarder (FPR) type and naked-eye type). The 3D signal for the clock controller of different display panels is outputted via the 3D signal output circuit. In FIG. 4, a video signal with a resolution of 2k×1k is received at the receiving circuit for the full high definition video signal. Thus, the video signal with a resolution of 2k×1k should be converted into a video signal with a resolution of 4k×2k by a frequency conversion circuit at first. The sequent signal processings in FIG. 4 are same with those in FIG. 3, which should be omitted herein.

The following table lists the operation states of the respective circuit modules in 14 input modes which are available in the above device according to the embodiment of the invention, wherein ○ indicates that there is a current passing through the corresponding circuit module, - indicates that there is no current passing through the corresponding circuit module.

| No | 2D/3D | Input | LVDS Rx | TMDS Rx | 4k2k Up Scaler | RGB → YUV | Enhancer RGB Processor | OSD | FRC | 3D Decoder | Local Dimming | S/G Timing | Active Barrier Control | V by One Tx |
|---|---|---|---|---|---|---|---|---|---|---|---|---|---|---|
| 1 | 2D | External 2D 4k2k 60 Hz | — | ○ | — | ○ | ○ | ○ | ○ | omitted | ○ | — | — | ○ |
| 2 | 2D | LVDS 2D FHD(2k1k) | ○ | — | ○ | ○ | ○ | ○ | ○ | omitted | ○ | — | — | ○ |
| 3 | 2D→3D | External 2D 4k2k 60 Hz | — | ○ | — | ○ | ○ | ○ | ○ | 2D→3D Line by Line | ○ | — | — | ○ |
| 4 | 2D→3D | External 2D 4k2k 60 Hz | — | ○ | — | ○ | ○ | ○ | ○ | 2D→3D FPR | ○ | ○ | — | ○ |
| 5 | 2D→3D | External 2D 4k2k 60 Hz | — | ○ | — | ○ | ○ | ○ | ○ | 2D→3D 9view | ○ | — | ○ | ○ |
| 6 | 2D→3D | LVDS 2D FHD(2k1k) | ○ | — | ○ | ○ | ○ | ○ | ○ | 2D→3D Line by Line | ○ | — | — | ○ |

-continued

| No | 2D/3D | Input | LVDS Rx | TMDS Rx | 4k2k Up Scaler | RGB → YUV | Enhancer RGB Processor | OSD | FRC | 3D Decoder | Local Dimming | S/G Timing | Active Barrier Control | V by One Tx |
|---|---|---|---|---|---|---|---|---|---|---|---|---|---|---|
| 7 | 2D→3D | LVDS 2D FHD(2k1k) | ○ | — | ○ | ○ | ○ | ○ | ○ | 2D→3D FPR | ○ | ○ | — | ○ |
| 8 | 2D→3D | LVDS 2D FHD(2k1k) | ○ | — | ○ | ○ | ○ | ○ | ○ | 2D→3D 9view | ○ | — | ○ | ○ |
| 9 | 3D | External 2D 4k2k 60 Hz | — | ○ | — | ○ | ○ | ○ | ○ | 3DLR→3D Line by Line | ○ | — | — | ○ |
| 10 | 3D | External 2D 4k2k 60 Hz | — | ○ | — | ○ | ○ | ○ | ○ | 3DLR→3D FPR | ○ | ○ | — | ○ |
| 11 | 3D | External 2D 4k2k 60 Hz | — | ○ | — | ○ | ○ | ○ | ○ | 3DLR→3D 9view | ○ | — | ○ | ○ |
| 12 | 3D | LVDS 2D FHD(2k1k) | ○ | — | ○ | ○ | ○ | ○ | ○ | 3DLR→3D Line by Line | ○ | — | — | ○ |
| 13 | 3D | LVDS 2D FHD(2k1k) | ○ | — | ○ | ○ | ○ | ○ | ○ | 3DLR→3D FPR | ○ | ○ | — | ○ |
| 14 | 3D | LVDS 2D FHD(2k1k) | ○ | — | ○ | ○ | ○ | ○ | ○ | 3DLR→3D 9view | ○ | — | ○ | ○ |

Based on the same inventive concept, the embodiment of the invention may further provide an ultra high definition 3D display system as shown in FIG. 2, particularly including a video processing device and a display device.

The display device may comprises a display screen, the above ultra high definition 3D conversion device according to the embodiment of the invention and a control chip, which controls to perform 3D display according to the 3D signal transmitted by the ultra high definition 3D conversion device, wherein the control chip may be for example a clock controller (TCON), a control chip of the backlight module (LED Diver) and a control chip for the grating barrier (Barrier) etc.

The video processing device may comprise a digital television system on chip (DTV SOC) which may transmit a full high definition video signal to the ultra high definition 3D conversion device.

The ultra high definition 3D conversion device of the above system according to the embodiment of the invention may be the same with the previously discussed embodiment, the detailed description thereof will be omitted. Furthermore, the display screen and the video processing device in the above system both belong to the common knowledge in the art, which are not discussed in detail.

By describing the above implementations, those skilled in the art will appreciate that the embodiment of the invention can be implemented by hardware, or may implemented with the help of software along with a necessary common platform of hardware. Based on the understanding, the technical solution of the embodiment of the invention may be embodied in a software product, which may stored in a non-volatile storage medium (including a CD-ROM, a USB, a removable disc and the like), wherein the non-volatile storage medium may include several instructions which enable a computer device (such as a personal computer, a sever or a network device) performing the method according to the embodiments of the invention.

Those skilled in the art may understand that the drawing figures are merely the schematic diagrams of one preferred embodiment. The modules or procedures in the figures may be not necessary for implementing the invention.

Those skilled in the art will understand that the modules in the ultra high definition conversion device according to the embodiment may be distributed in the device in a manner as discussed in the embodiment, or may change correspondingly and be distributed in one or more devices different from the present embodiment. The modules of the previously discussed embodiment may be combined into one module, or divided into a plurality of sub-modules.

The serial numbers of the above embodiments of the invention are only used for describing, and do not represent the priority of the embodiments.

The above ultra high definition 3D conversion device and the display system according to the embodiment of the invention may convert the received full high definition video signal or ultra high definition video signal into a 3D signal corresponding to the type of 3D display after performing an image quality process, according to the type of 3D display chosen by a user. This may achieve the Active Shutter type, Film-type Patterned Retarder (FPR) type and naked-eye type of 3D display for the ultra high definition video signal.

Obviously, those skilled in the art can make variable modifications and variations to the invention without departing from the spirit and scope of the invention. The invention intends to cover all modifications and/or equivalents and alternatives falling within, the various example embodiments of the present disclosure.

The invention claimed is:

1. An ultra high definition 3D conversion device, including:
    a receiving module, for receiving an ultra high definition video signal, or receiving a full high definition video signal and converting the received full high definition video signal into an ultra high definition video signal;
    an image quality processing module, for processing the image quality of the ultra high definition video signal received or converted by the receiving module;

a 3D signal processing module, for converting the ultra high definition video signal processed by the image quality processing module into a 3D signal corresponding to the type of 3D display, wherein the type of 3D display includes an Active Shutter type, a Film-type Patterned Retarder type and a naked-eye type; and an output module, for sending the 3D signal to the control chip corresponding to the type of 3D display in the display screen, wherein the 3D signal processing module includes:

a 3D signal conversion circuit, for converting a 2D signal into a 3D signal and outputting the converted 3D signal when the ultra high definition video signal processed by the image quality processing module is the 2D signal: or outputting a 3D signal directly when the ultra high definition video signal processed by the image quality processing module is the 3D signal, and wherein the 3D signal processing module further includes at least one of:

a generation circuit for FPR 3D signals, for generating a FPR 3D signal according to the 3D signal output by the 3D signal conversion circuit to be viewed through a FPR glasses;

a generation circuit for active shutter 3D signals, for generating an active shutter 3D signal according to the 3D signal output by the 3D signal conversion circuit to be viewed through an active shutter glasses; and a generation circuit for naked-eye 3D signals, for generating a naked-eye 3D signal according to the 3D signal output by the 3D signal conversion circuit to be viewed after the modulation by a grating barrier before the display screen.

2. The ultra high definition 3D conversion device of claim 1, wherein the receiving module includes:

a receiving circuit for a full high definition video signal, for receiving the full high definition video signal transmitted from a digital television system on chip;

a frequency conversion circuit, for converting the full high definition video signal received by the receiving circuit for a full high definition video signal, into an ultra high definition video signal; and a receiving circuit for an ultra high definition video signal, for receiving the ultra high definition video signal transmitted from an external input source.

3. The ultra high definition 3D conversion device of claim 2, wherein the receiving module further includes:

a data register circuit, for receiving a full high definition video signal transmitted from an external Flash circuit; and wherein the receiving circuit for a full high definition video signal is further used for receiving the full high definition video signal forwarded by the data register circuit.

4. The ultra high definition 3D conversion device of claim 1, wherein the image quality processing module includes:

a format conversion circuit, for converting the ultra high definition video signal received or converted by the receiving module from a RGB signal into a YUV signal; and a signal optimization circuit, for performing a edge enhancement and an image quality adjustment process on the YUV signal converted by the format conversion circuit, and then converting into a RGB signal.

5. The ultra high definition 3D conversion device of claim 4, wherein the image quality processing module further includes:

an aspect ratio modulation circuit, for modulating the aspect ratio of the ultra high definition video signal received or converted by the receiving module according to the aspect ratio chosen by a user.

6. The ultra high definition 3D conversion device of claim 4, wherein the image quality processing module includes:

a frequency doubling circuit, for doubling the frequency of the ultra high definition video signal received or converted by the receiving module from 60 Hz to 120 Hz.

7. The ultra high definition 3D conversion device of claim 1, further includes: a backlight adjustment circuit, for generating a control signal for controlling the backlight module in the display screen, according to the ultra high definition video signal processed by the image quality processing module, and then sending the control signal to the control chip of the backlight module.

8. An ultra high definition 3D display system, including:

a display device, which has a display screen, the ultra high definition 3D conversion device of claim 1, and a control chip, configured to control the display screen to perform the 3D display according to the 3D signal transmitted from the ultra high definition 3D conversion device, and a video processing device, which has a digital television system on chip configured to send a full high definition video signal to the ultra high definition 3D conversion device.

9. The ultra high definition 3D conversion device of claim 1, wherein the 3D signal processing module further includes at least one of:

a generation circuit for FPR 3D signals, for generating a FPR 3D signal according to the 3D signal output by the 3D signal conversion circuit to be viewed through a FPR glasses;

a generation circuit for active shutter 3D signals, for generating an active shutter 3D signal according to the 3D signal output by the 3D signal conversion circuit to be viewed through an active shutter glasses; and a generation circuit for naked-eye 3D signals, for generating a naked-eye 3D signal according to the 3D signal output by the 3D signal conversion circuit to be viewed after the modulation by a grating barrier before the display screen, wherein the 3D signal processing module includes:

a 3D signal conversion circuit, for converting a 2D signal into a 3D signal and outputting the converted 3D signal when the ultra high definition video signal processed by the image quality processing module is the 2D signal: or outputting a 3D signal directly when the ultra high definition video signal processed by the image quality processing module is the 3D signal, and wherein the 3D signal processing module further includes at least one of:

a generation circuit for FPR 3D signals, for generating a FPR 3D signal according to the 3D signal output by the 3D signal conversion circuit to be viewed through a FPR glasses;

a generation circuit for active shutter 3D signals, for generating an active shutter 3D signal according to the 3D signal output by the 3D signal conversion circuit to be viewed through an active shutter glasses; and a generation circuit for naked-eye 3D signals, for generating a naked-eye 3D signal according to the 3D signal output by the 3D signal conversion circuit to be viewed after the modulation by a grating barrier before the display screen.

10. The ultra high definition 3D display system of claim 9 wherein the output module includes:
   a 3D signal output circuit, for sending at least one of the FPR 3D signal, the active shutter 3D signal and the naked-eye 3D signal to the respective clock controllers in the display screen after dividing at least one of the FPR 3D signal, the active shutter 3D signal and the naked-eye 3D signal into multipath;
   an adjustment circuit for an active shutter glasses, for generating a control signal for controlling the switching of the left and right lens of the active shutter glasses according to the active shutter 3D signal, and then sending the control signal to the control chip of the active shutter glasses; and
   an adjustment circuit for an grating barrier, for generating a control signal for adjusting the grating barrier to achieve 3D display according to the naked-eye 3D signal, and then sending the control signal to the control chip of the grating barrier.

11. The ultra high definition 3D display system of claim 9, wherein the receiving module includes:
   a receiving circuit for a full high definition video signal, for receiving the full high definition video signal transmitted from a digital television system on chip;
   a frequency conversion circuit, for converting the full high definition video signal received by the receiving circuit for a full high definition video signal, into an ultra high definition video signal; and
   a receiving circuit for an ultra high definition video signal, for receiving the ultra high definition video signal transmitted from an external input source.

12. The ultra high definition 3D display system of claim 11, wherein
   a data register circuit, for receiving a full high definition video signal transmitted from an external Flash circuit; and
   wherein the receiving circuit for a full high definition video signal is further used for receiving the full high definition video signal forwarded by the data register circuit.

13. The ultra high definition 3D display system of claim 9, wherein the image quality processing module includes:
   a format conversion circuit, for converting the ultra high definition video signal received or converted by the receiving module from a RGB signal into a YUV signal; and
   a signal optimization circuit, for performing a edge enhancement and an image quality adjustment process on the YUV signal converted by the format conversion circuit, and then converting into a RGB signal.

14. The ultra high definition 3D display system of claim 13, wherein the image quality processing module further includes:
   an aspect ratio modulation circuit, for modulating the aspect ratio of the ultra high definition video signal received or converted by the receiving module according to the aspect ratio chosen by a user.

15. The ultra high definition 3D display system of claim 13, wherein the image quality processing module includes:
   a frequency doubling circuit, for doubling the frequency of the ultra high definition video signal received or converted by the receiving module from 60 Hz to 120 Hz.

16. The ultra high definition 3D display system of claim 9, further includes: a backlight adjustment circuit, for generating a control signal for controlling the backlight module in the display screen, according to the ultra high definition video signal processed by the image quality processing module, and then sending the control signal to the control chip of the backlight module.

* * * * *